US012032649B2

(12) United States Patent
Siddiquee et al.

(10) Patent No.: US 12,032,649 B2
(45) Date of Patent: *Jul. 9, 2024

(54) SYSTEMS AND METHODS FOR UTILIZING CONNECTORS TO OBTAIN WEB CONTENT

(71) Applicant: SDL Netherlands B.V., Amsterdam (NL)

(72) Inventors: Likhan Siddiquee, Utrecht (NL); Ivo van de Lagemaat, North Holland (NL); Dominique Leblond, Nieuw-Vennep (NL); Lars Møllebjerg, Amsterdam (NL); Franciscus Petrus Paulus van Puffelen, Stoneham, MA (US)

(73) Assignee: SDL Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,907

(22) Filed: Apr. 25, 2023

(65) Prior Publication Data

US 2023/0259576 A1    Aug. 17, 2023

Related U.S. Application Data

(60) Division of application No. 17/827,607, filed on May 27, 2022, which is a continuation of application No.
(Continued)

(51) Int. Cl.
*G06F 15/16* (2006.01)
*G06F 16/958* (2019.01)

(52) U.S. Cl.
CPC .......... *G06F 16/972* (2019.01); *G06F 16/958* (2019.01)

(58) Field of Classification Search
CPC ............................ G06F 16/972; G06F 16/958
(Continued)

(56) References Cited

U.S. PATENT DOCUMENTS 6,338,056 B1    1/2002    Dessloch et al.
7,383,320 B1    6/2008    Silberstein et al.
(Continued)

FOREIGN PATENT DOCUMENTS

EP    1170680 A2    1/2002

OTHER PUBLICATIONS

Leblond, Dominique, "Blueprinting of Multimedia Assets", U.S. Appl. No. 13/619,591, filed Sep. 14, 2012, 40 pages.
(Continued)

*Primary Examiner* — Liang Che A Wang
(74) *Attorney, Agent, or Firm* — Carr & Ferrell LLP

(57) ABSTRACT

Systems that utilize connectors are provided. An example system includes a first computer configured to generate web content that comprises at least one reference that is indicative of at least one asset stored on an external system that is remote to the first computer and at least one local asset stored on a local content repository that is local to the first computer, the at least one local asset comprising content; a second computer configured to publish the web content when requested by an end user; and a third computer configured to provide a connector that is accessible to both the first computer and the second computer, the first computer being further configured to generate the at least one reference, the second computer being configured to resolve the at least one reference and obtain the at least one asset from the external system using the connector.

22 Claims, 9 Drawing Sheets

Related U.S. Application Data

16/227,420, filed on Dec. 20, 2018, now Pat. No. 11,386,186, which is a continuation-in-part of application No. 13/886,194, filed on May 2, 2013, now Pat. No. 10,452,740, which is a continuation of application No. 13/620,187, filed on Sep. 14, 2012, now abandoned.

(58) Field of Classification Search
USPC .............................. 709/201, 217, 218, 219
See application file for complete search history.

(56) References Cited

U.S. PATENT DOCUMENTS

| | | |
|---|---|---|
| 7,836,110 B1 | 11/2010 | Schoenbach et al. |
| 8,015,222 B2 | 9/2011 | Abnous et al. |
| 8,024,357 B2 | 9/2011 | Bendel et al. |
| 8,909,683 B1 | 12/2014 | Ledet |
| 9,092,405 B1 | 7/2015 | Hayden |
| 10,452,740 B2 | 10/2019 | Leblond et al. |
| 10,678,866 B1 | 6/2020 | Ranganathan et al. |
| 11,386,186 B2 | 7/2022 | Siddiquee et al. |
| 2001/0029507 A1 | 10/2001 | Nojima |
| 2002/0023101 A1 | 2/2002 | Kurihara et al. |
| 2002/0138841 A1 | 9/2002 | Ward |
| 2002/0174227 A1 | 11/2002 | Hartsell et al. |
| 2003/0014483 A1 | 1/2003 | Stevenson et al. |
| 2003/0046396 A1 | 3/2003 | Richter et al. |
| 2003/0158953 A1 | 8/2003 | Lal |
| 2004/0002939 A1 | 1/2004 | Arora et al. |
| 2004/0015723 A1 | 1/2004 | Pham et al. |
| 2004/0148409 A1 | 7/2004 | Davis et al. |
| 2004/0187090 A1 | 9/2004 | Meacham |
| 2005/0287509 A1 | 12/2005 | Mohler |
| 2006/0068367 A1 | 3/2006 | Parke et al. |
| 2006/0080397 A1 | 4/2006 | Chene et al. |
| 2006/0095443 A1 | 5/2006 | Kumar et al. |
| 2007/0047781 A1 | 3/2007 | Hull et al. |
| 2007/0048714 A1 | 3/2007 | Plastina et al. |
| 2007/0192374 A1 | 8/2007 | Abnous et al. |
| 2007/0209005 A1 | 9/2007 | Shaver et al. |
| 2007/0209080 A1 | 9/2007 | Ture et al. |
| 2008/0027992 A1 | 1/2008 | Vadavia et al. |
| 2008/0028300 A1 | 1/2008 | Krieger et al. |
| 2008/0256235 A1 | 10/2008 | Or Sim et al. |
| 2009/0061764 A1 | 3/2009 | Lockhart et al. |
| 2009/0259684 A1 | 10/2009 | Knight et al. |
| 2009/0313245 A1 | 12/2009 | Weyl et al. |
| 2010/0217783 A1 | 8/2010 | Farver et al. |
| 2010/0306402 A1 | 12/2010 | Russell et al. |
| 2011/0060998 A1 | 3/2011 | Schwartz et al. |
| 2011/0078626 A1 | 3/2011 | Bachman et al. |
| 2012/0023129 A1 | 1/2012 | Vedula et al. |
| 2012/0131441 A1 | 5/2012 | Jitkoff et al. |
| 2012/0221407 A1 | 8/2012 | Erasmus et al. |
| 2013/0073473 A1 | 3/2013 | Heath |
| 2013/0282859 A1 | 10/2013 | McDonald |
| 2013/0326345 A1 | 12/2013 | Haggart et al. |
| 2014/0081775 A1 | 3/2014 | Leblond et al. |
| 2014/0082032 A1 | 3/2014 | Leblond et al. |
| 2014/0114864 A1 | 4/2014 | Babich et al. |
| 2014/0181013 A1 | 6/2014 | Micucci et al. |
| 2014/0297759 A1 | 10/2014 | Mody |
| 2019/0158567 A1 | 5/2019 | Siddiquee et al. |
| 2022/0292161 A1 | 9/2022 | Siddiquee et al. |

OTHER PUBLICATIONS

Padmanabhan et al., "Using Predictive Prefetching to Improve World Wide Web Latency," ACM SIGCOMM Computer Communication Review 26.3, 1996, pp. 22-36.

SYSTEMS AND METHODS FOR UTILIZING CONNECTORS TO OBTAIN WEB CONTENT

CROSS REFERENCE(S) TO RELATED APPLICATION(S)

This application is a divisional of U.S. patent application Ser. No. 17/827,607, filed on May 27, 2022, which is a continuation of U.S. patent application Ser. No. 16/227,420, filed on Dec. 20, 2018, which is continuation-in-part of U.S. patent application Ser. No. 13/886,194, filed on May 2, 2013, entitled "External Content Libraries," which is a continuation application of U.S. patent application Ser. No. 13/620,187, filed on Sep. 14, 2012, entitled "External Content Libraries," all of which are hereby incorporated by reference herein in their entirety including all references and appendices cited therein.

FIELD OF THE PRESENT TECHNOLOGY

The present technology relates generally to content management systems, and more specifically, but not by way of limitation, to external content library connector systems that manage connectors expose external content libraries to content management systems and dynamic experience delivery systems. In some embodiments, dynamic experience delivery systems can resolve references placed into web content by the content management systems using the connectors of the external content library connector systems.

SUMMARY OF THE PRESENT TECHNOLOGY

According to some embodiments, the present technology may be directed to methods for using an external content library. These systems can comprise a content management system configured to create web content that includes at least one asset that resides on an external system that is remote to the system, the web content comprising a reference to the at least one asset; an external content library connector system exposing connectors that are accessible to both the content management system and a dynamic experience delivery system; and the dynamic experience delivery system configured to invoke the external content library connector system to obtain the at least one asset based on the reference using one or more of the connectors; and publish the web content with the at least one asset included therein.

According to other embodiments, the present technology may be directed to content management systems that utilize external content libraries. Example systems can comprise: a first computer comprising at least one processor coupled to at least one memory, the first computer configured to generate web content that comprises at least one reference that is indicative of at least one asset stored on an external system that is remote to the first computer; a second computer comprising at least one processor coupled to at least one memory, the second computer configured to publish the web content when requested by an end user; and a third computer comprising at least one processor coupled to at least one memory, the third computer configured to provide a connector that is accessible to both the first computer and the second computer, the first computer being further configured to generate the at least one reference, the second computer being configured to resolve the at least one reference and obtain the at least one asset from the external system using the connector.

According to additional embodiments, the present technology may be directed to methods for using an external content repository. The methods may comprise generating a connector for an external system that stores an asset remotely using an external content library connector system; generating, by a content management system, web content that comprises a reference for the asset, the reference identifying at least one of the external system or the connector; publishing the web content with the reference to a dynamic experience delivery system; receiving, by the dynamic experience delivery system, a request for the web content from an end user computing system; resolving the at least one reference by: locating the reference in the web content; invoking the connector identified by the at least one reference; obtaining the asset from the external system using the connector; and replacing the reference with the asset in the web content; and delivering the web content with the asset to the end user computing system.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
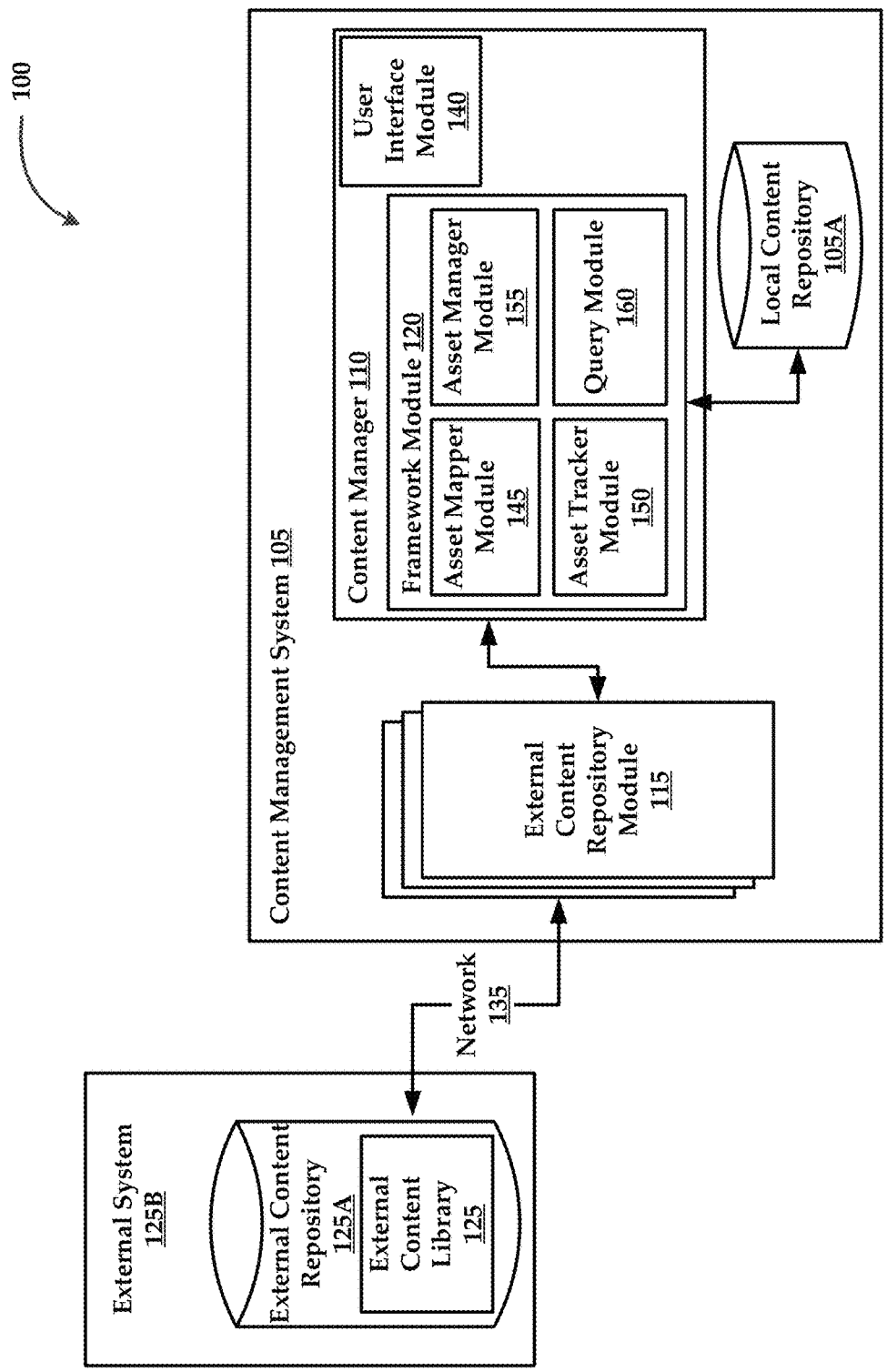
FIG. 1 illustrates an exemplary architecture for practicing aspects of the present disclosure.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed, in some embodiments, to content management systems that utilize external content libraries, which may be stored in an external content repository that resides, for example, on a web server. It will be understood that the external content library and/or the external content repository may be owned by a different entity from the entity or entities that own the content management system. Additionally, individual assets from a plurality of assets of an external content library may be owned by separate entities.

The present technology may be utilized to virtually mount an external content library (or the external content repository) to a content management system. These content management systems (hereinafter referred to as "CMS") may also utilize one or more local content repositories. The CMS may employ external content providers (e.g., modules) that each communicatively interface with various external content libraries. In some instances, an external content provider may be configured to interface with a particular class of external content libraries. For example, an external content provider may interface with a Microsoft SharePoint™ library or libraries.

CMS of the present technology may also comprise a framework module that is configured to register one or more external content libraries with the CMS. The framework module may also configure the external content libraries for use within the CMS. Again, the external content libraries may be connected through the external repository provider modules. Exemplary configurations may include, but are not limited to, end-point configuration, transport-level security configuration, and/or trust relationship for end-user asset provisioning.

The framework module may also be utilized to map end-user assets of an external content library that are utilized in various publications created within the CMS. That is, when an end user creates web content in the CMS system, the framework module may be utilized to create and manage mappings or linkages between assets residing in an external content library within an external content repository and the web content being created within the CMS. Exemplary web content may comprise, for example, a web page.

In some instances, the present technology may utilize a built-in Security Token Services (STS) available through the CMS. The STS may be used to establish secure trusted connection between CMS and one or more external content repositories. In other instances, the present technology may utilize an external STS such as Active Directory Federation Services™, Windows Azure Active Directory™/Access Control Service (WAAD/ACS), Tivoli Access Manager™, Ping Identity™, or other external STS that would be known to one of ordinary skill in the art.

In general, the external content provider module(s) and the framework module may be individually or cooperatively executed to provide any combination of the following functionalities: (a) mapping of external content libraries onto the CMS management structure; (b) provision of content/assets and associated basic info from external content libraries; (c) providing notification to external content libraries of usage of content/assets in the CMS, such as check-in/check-out, publishing, and so forth; (d) block management capabilities for the content/assets in external content libraries; (e) extended CMS search functions with federated search capabilities into external content libraries; (f) ability to modify content/assets in external content libraries; (g) ability to upload content/assets into external content libraries; and (h) an ability to manage multiple renditions (versions) of content/assets of external content libraries.

These and other advantages of the present technology will be described in greater detail below with reference to the collective drawings (e.g., FIGS. 1-5).

FIG. 1 illustrates an exemplary architecture 100 for practicing aspects of the present technology. According to some embodiments, the exemplary architecture 100, hereinafter "architecture 100," may generally include a content management system, hereinafter "CMS 105." According to some embodiments, the CMS 105 may be configured to virtually mount an external content library such that assets stored in the external content library are accessible through the content management system similarly to local assets of a local content repository associated with the content management system.

According to various embodiments, the CMS 105 may be configured to use an external content library by registering an external content library with the CMS 105 using an external content provider module. Additionally, the CMS 105 may then map assets of the external content library for use within the CMS 105.

The CMS 105 is shown as comprising a content manager 110 that communicatively couples with one or more external content provider modules, such as external content repository module 115. The CMS 105 may also comprise a framework module 120 that governs the interactions between the content manager 110 and an external content library 125, via the external content repository module 115. Generally speaking, the CMS 105 may be configured to utilize one or more external content repositories, such as the external content library 125, as well as a local content repository 105A. The external content repository module 115 and the framework module 120 cooperate to provide end users with access to assets that reside on the external content library 125, as if the assets were stored locally on the local content repository 105A, as will be described in greater detail infra.

The external content library 125 may be stored in an external content repository 125A that resides on an external system 125B such as a web server or computing device that is positioned remotely from the CMS 105. It will be understood that the external content library 125 and the CMS 105 may preferably be owned by different entities. Additionally, individual assets on the external content library 125 may be associated or owned by different owners such that the external content library 125 includes assets for a plurality of owners. The external content library 125 and the CMS 105 may be communicatively coupled via a network 135. It is noteworthy to mention that the network 135 include any one (or combination) of private or public communications networks such as the Internet. In some instances, an external content repository module 115 may communicatively couple with the external content repository 125A via an application programming interface (API). The API used by the external content repository module 115 may include a secure or insecure API.

In some instances, the CMS 105 may be implemented within a cloud-based computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo! ™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

The content manager 110 of the CMS 105 may be utilized by content authors to design, create, and manage web contents such as web pages using various web development tools that would be known to one of ordinary skill in the art. Content authors may create web contents from scratch, or in some instance, utilize templates.

In some embodiments, the content manager 110 may utilize web content blueprinting features within the CMS 105 to effectively manage assets across a plurality of types of web content that share a common domain. For example, a branded product may be advertised using a plurality of websites that are related to, and inherit basic layout and assets from, a common parent web page. Rather than having to recreate or modify each web page as the assets or layout of one of the web pages is modified, the blueprinting functions of the CMS 105 may automatically distribute appropriate changes throughout the plurality of web pages, as appropriate. Content may be localized for each web page as necessary, for example, by making the assets and/or formatting of the web page culturally and/or contextually appropriate. In a non-limiting example, a change in an asset such as textual content on a parent web page may be pushed down through each child web page that is linked to the parent web page. This updated content may be localized by modifying the content such that it is contextually and/or culturally appropriate. For example, the assets may be translated, edited, or otherwise modified. Additionally, the formatting of the web page (e.g., layout) may be localized to appeal to a particular demographic or culture. Additional details regarding the blueprinting features of the CMS 105 can be found in U.S. patent application Ser. No. 13/886,199, filed May 2, 2013, entitled "Blueprinting of Multimedia Assets," which is hereby incorporated by reference herein in its entirety including all references cited therein.

Figure 2:
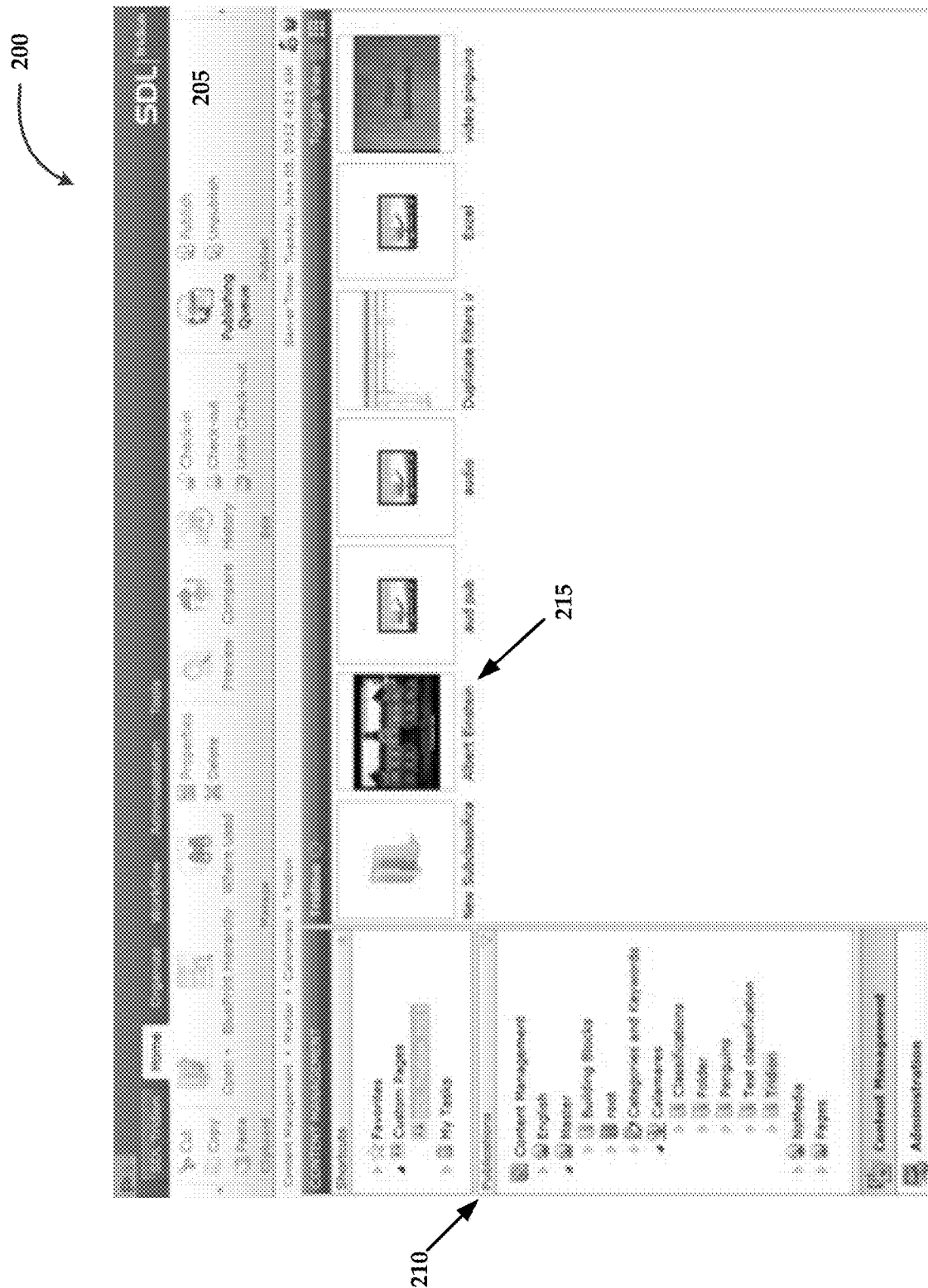
FIG. 2 is an exemplary graphical user interface in the form of an external content repository browser.
Figure 3:
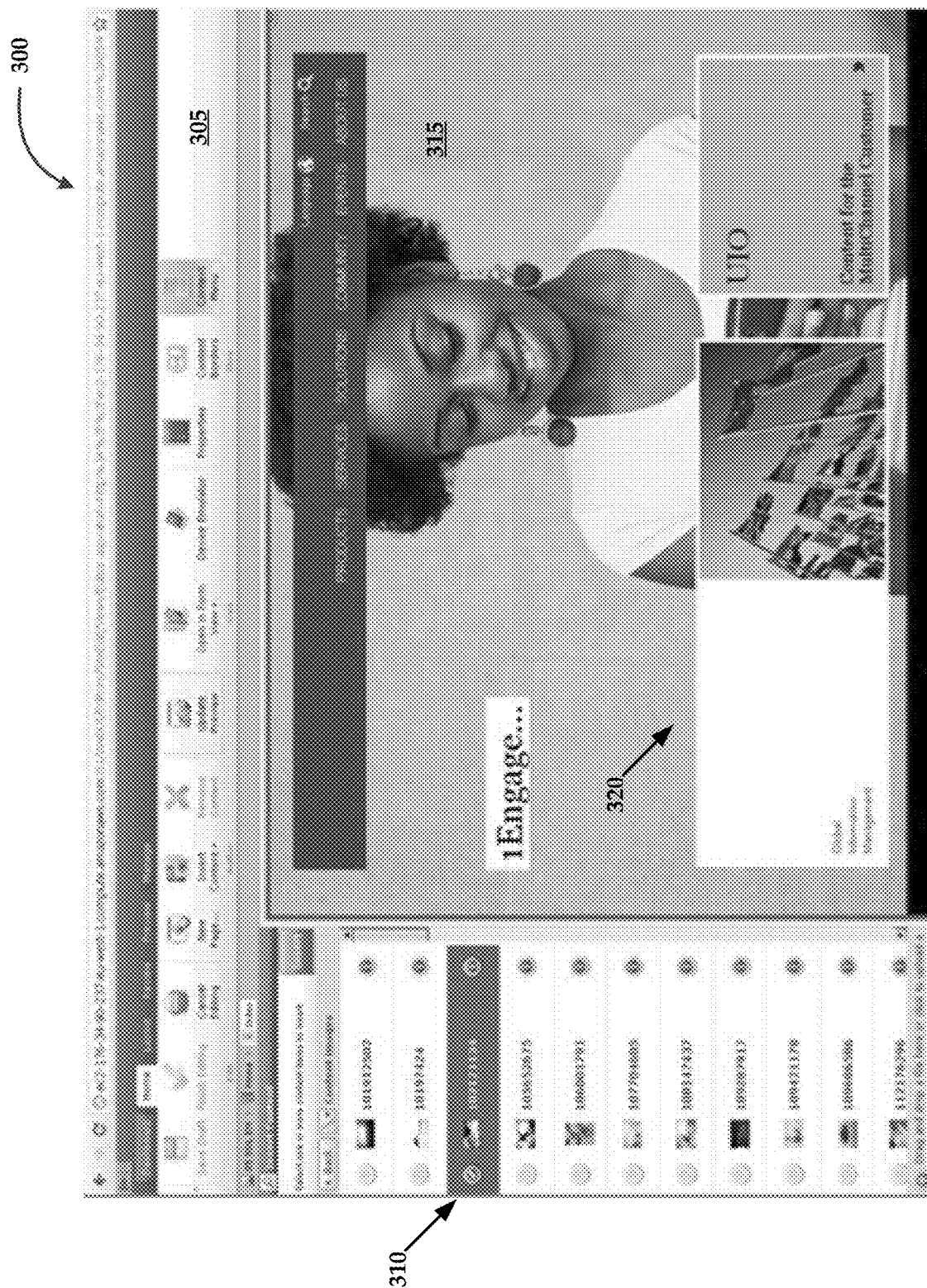
FIG. 3 is an exemplary graphical user interface in the form of a media manager provider interface.

In general, content authors may create web content using graphical user interfaces generated by a user interface module 140 of the content manager 110. An exemplary graphical user interface in the form of an external content repository browser window, generated by the user interface module 140 is illustrated in FIG. 2. An exemplary graphical user interface in the form of a media manager provider interface, generated by the user interface module 140 is illustrated in FIG. 3. Each of these graphical user interfaces will be described in greater detail infra.

As mentioned before, the CMS 105 may include one or more external content provider modules, such as the external content repository module 115 that each registers with an individual external content library. In some instances, a single external content provider module may register with more than one external content library, and further, the single external content provider module may register with multiple external content libraries of differing domains (e.g., classes).

The external content repository module 115 may register the external content library 125 using an API. The API may utilize either secure or insecure data transmission methods for exchanging data between the external content repository module 115 and the content manager 110. In some instances, content authors or system administrators may configure settings that are utilized by the external content repository module 115 for exchanging data between the external content repository module 115 and the content manager 110. For example, a system administrator may establish end point configuration settings for exchanging data between the external content library and the external content provider.

In various embodiments, registering the external content library 125 with the external content repository module 115 may comprise establishing a transport level security configuration between the external content library 125 and the external content repository module 115. According to some embodiments, configuration settings may comprise the establishment of a trust relationship for end-user asset provisioning. For example, content authors may be required to present and/or verify their identity before accessing assets that reside on an external content repository.

Once the external content library 125 has been registered with the CMS 105 via the external content repository module 115, the framework module 120 may be executed to map at least a portion of the content (e.g., assets) that resides on the external content repository.

Generally speaking, the framework module 120 may comprise an asset mapper module 145, an asset tracker module 150, an asset manager module 155, and a query module 160. It is noteworthy that the framework module 120 may include additional or fewer modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the framework module 120 may include separately configured web servers.

The asset mapper module 145 may be configured to map the assets that reside on the external content library 125 to the content manager 110 such that the contents of the external content library 125 are made available to the content manager 110 similarly to content or assets stored locally on a local content repository of the CMS 105.

Mapping of the assets may include identifying assets included in one or more external content libraries that reside within file systems or file structures (e.g., folders, subfolders, drives, etc.) of the external content repository 125A. Once the assets have been identified, the asset mapper module 145 to determine particular types of information regarding each type of asset. For example, the asset mapper module 145 may be configured to determine a file name, file type, file size, file version, and/or any other types of file information that would be known to one of ordinary skill in the art. Various combinations of these types of information may also be gathered. Additionally, the asset mapper module 145 may obtain or generate a thumbnail image of each asset that is mapped, if available.

Once the assets of the external content library 125 have been mapped by the asset mapper module 145, the assets are made available to the content manager 110 as if the assets were stored locally on the local content repository 105A. For example, when a content author is creating web content and the content author queries the content manager 110 for available assets, mapped assets that are stored on the external content library 125 are returned in the search results, along with any local assets that reside on the local content repository 105A.

Additionally, the mapped assets of the external content library 125 may be viewed by a content author via the content manager 110 by way of a graphical user interface generated by the user interface module 140. FIG. 2 illustrates an exemplary user interface in the form of an external content repository browser window 200. This browser window 200 may resemble an explorer window that would be generated by an operating system, a browser window generated by a web browser application, or any other suitable interface that would allow the end user to browse the contents of a file structure, such as a folder. The browser window 200 may comprise a web content ribbon 205 that allows a content author to manage web content using a plurality of features. Again, these features may comprise blueprinting features, publishing features, web content editing features, as well as other features that would be known to one of ordinary skill in the art.

The browser window 200 may also comprise a content management pane 210 that provides views of various publications (e.g., web content) and their constituent assets in a hierarchical format. The browser window 200 may also comprise an asset pane that includes a plurality of assets. These assets have been mapped to the content manager 110 such that the assets may be displayed to the content author. In this example, thumbnail images of assets of an external content library are displayed to the content author. An exemplary asset 215 of a video file regarding "Albert Einstein" is represented by a thumbnail image. In some embodiments, right clicking or hovering over an asset in the browser window 200 may cause the user interface module 140 to display information regarding the asset such as a file name, file size, and so forth. Again, these file attributes were determined during mapping of the assets by the asset mapper module 145.

After browsing for assets on the external content repository, the content author may select an asset from the external content library for use in the creation of web content, such as a web page. The selection and inclusion of the asset causes the asset mapper module 145 to perform a second type of mapping. More specifically, the second type of mapping executed by the asset mapper module 145 may link a selected asset to web content being created by the content author. That is, the framework module 120 of the content manager 110 may utilize the asset mapper module 145 to manage links between, for example, a web page created by the content author, and an asset located on an external content repository that has been selected for inclusion into the web page. Thus, when the web page is published, the linked asset may be obtained from the external content repository when the web page is requested. In other embodiments described infra, a reference can be published to a dynamic experience delivery service/system. This reference can be resolved using a connector that was used to generate the reference.

According to some embodiments, the present technology may support various types of content deployment. For example, in some instances the content manager 110 may create publishing packages. These publishing packages may comprise a web page that includes various assets that are stored in external and/or local content repositories. Assets may be retrieved and combined with other web page elements to create a complete web page within the content management system.

In other instances, the content manager 110 may cooperate with the asset mapper module 145 to assemble web pages dynamically. For example, the web page or web page blueprint may comprise references to assets stored in external and/or local content repositories. Upon receiving a request for the web page, the assets associated with the references may be retrieved and combined with other web page elements to create a completed web page that fulfills the request.

The asset mapper module 145 may also advantageously track the mapping between the asset on the external content library 125 and the content manager 110 such that changes to the asset are identified and updated in the content manager 110 to reduce the likelihood that changes in the asset will result in errors in retrieving the content at a later date. Therefore, the asset mapper module 145 may continuously or periodically evaluate the assets of the external content library 125 to identify changes in assets.

For example, if the owner of the asset on the external content library 125 changes the location of asset from one file folder to another file folder, the asset mapper module 145 may recognize this change and update the mapping between the asset and the web content to reflect this change. In sum, the mapping of assets by the asset mapper module 145 may not be only a static or singular event that occurs when the external content library 125 is initially registered, but may occur at regular or sporadic intervals to ensure that assets are available and properly linked to web content, as required.

As mentioned briefly above, the asset mapper module 145 may utilize a built-in Security Token Services (STS) to establish a secure trusted connection between CMS 105 and one or more external content repositories. In other instances, the asset mapper module 145 may utilize an external STS such as Active Directory Federation Services™, Windows Azure Active Directory™/Access Control Service (WAAD/ACS), Tivoli Access Manager™, Ping Identity™ or other external STS that would be known to one of ordinary skill in the art.

As assets residing on mapped external content libraries are utilized, the asset tracker module 150 may be executed to track the usage of such assets. For example, the asset tracker module 150 may identify when an asset has been included in a publication. The asset tracker module 150 may also identify when the asset has been requested by a publishing server, such as the web server that is utilized to publish the web content that includes the selected assets. Other similar metrics regarding the incorporation of assets within web content and/or actual usage (e.g., requests) of assets relative to their provisioning via delivery of the web content.

The asset tracker module 150 may provide usage information for an asset of the external content library utilized through the content management system to an owner of the asset. In some instances, the owner of the asset may be compensated for the inclusion of the asset within a web page or other web content. The tracking of asset usage by the asset tracker module 150 may provide a unique mechanism for compensating the owners of assets that reside on external content repositories. Advantageously, content authors may utilize assets that are external to the CMS 105 without being obligated to pay for access to the entire external content library. Additionally, the ability of the present technology to map and make available assets that are external to the CMS 105 allows for extending a corpus of assets that are available to the content library of the CMS 105 without obligating the system administrators of the CMS 105 to store assets locally, which increases the operating expenses for the CMS 105.

In sum, the ability of the present technology to register and map external content libraries to a local CMS 105 effectively creates a distributed and robust collection of assets for the CMS 105 that reduces the administrative cost and burden of maintaining a comprehensive content library.

According to some embodiments, the content manager 110 may be configured to allow content authors to modify assets stored on external content repositories by execution of an asset manager module 155. In some instances, proper authorization may be required from the owner of the assets of an external content library before a modification to an asset may be allowed. For example, the asset owner may be required to select various permissions for an asset, such as read, write, delete, and so forth.

In some instances, the content manager 110 may generate a user interface in the form of an editing interface that allows the content author to modify an asset. For example, the content author may be allowed to resize an asset such as an image. The content author may also make any other modifications to the image that would be both known to one of ordinary skill in the art and made allowable/permissible by the asset owner. The asset may be updated by modifying the asset locally at the content manager 110 and uploading the modified asset to the external content library 125 via the external content repository module 115. Generally, content authors may also be allowed to delete and/or upload assets to the external content library 125, with these changes being identified by the asset mapper module 145 to ensure that mappings remain valid.

In some embodiments, the asset manager module 155 may be utilized to manage versions of an asset of the external content library 125. For example, when an asset is modified locally at the content manager 110, the updated version of the asset may be stored in the external content library 125, along with the original version of the asset. The asset mapper module 145 may cooperate with the asset manager module 155 to track and map the usage of the various versions of an asset of the external content library 125.

One of the many advantages of the mapping of external assets for use in a local CMS 105 is that when a content author queries the content manager 110 of the CMS 105 for assets, the content manager 110 may provide results that include assets from local content repositories, as well as external content libraries. Thus, as the content author builds their web content and queries for content that the content author desires to utilize in their web content, the content author may view assets on external content libraries as if the resided locally on a local content repository.

Thus, the query module 160 may be executed to receiving a content query via the content manager 110. The query module 160 may search a local content repository associated with the content management system and the external content library using the content query, and return results in response to the content query. Again, the registering and mapping of assets on external content repositories to the CMS 105 results in the assets of the external content libraries being made available as if they were stored locally on a local content repository of the CMS 105.

FIG. 3 illustrates an exemplary user interface in the form of a media manager provider interface 300. This interface 300 may resemble an explorer window that would be generated by an operating system, a browser window generated by a web browser application, or any other suitable interface that would allow the end user to browse the content of a file structure. The interface 300 may comprise a web content ribbon 305 that allows a content author to manage web content using a plurality of features. Again, these features may comprise asset insertion/editing features, publishing features, emulation features, as well as other features that would be known to one of ordinary skill in the art.

The interface 300 may also comprise an asset pane 310 that provides views of various assets available to the content author. These assets have been mapped to the content manager 110 such that the assets may be displayed to the content author. Indeed, these assets may be displayed as a result of a query for assets as described above.

In this example, thumbnail images of assets that reside on an external content repository (and possibly a local content repository) are displayed to the content author. The assets may be selected for inclusion into an exemplary web page 315. Content authors may select and drop assets into the web page 315 such as an image asset 320.

Other assets such as a background image and a navigation pane may also be obtained from various internal and/or external content libraries as described in greater detail above.

Figure 4:
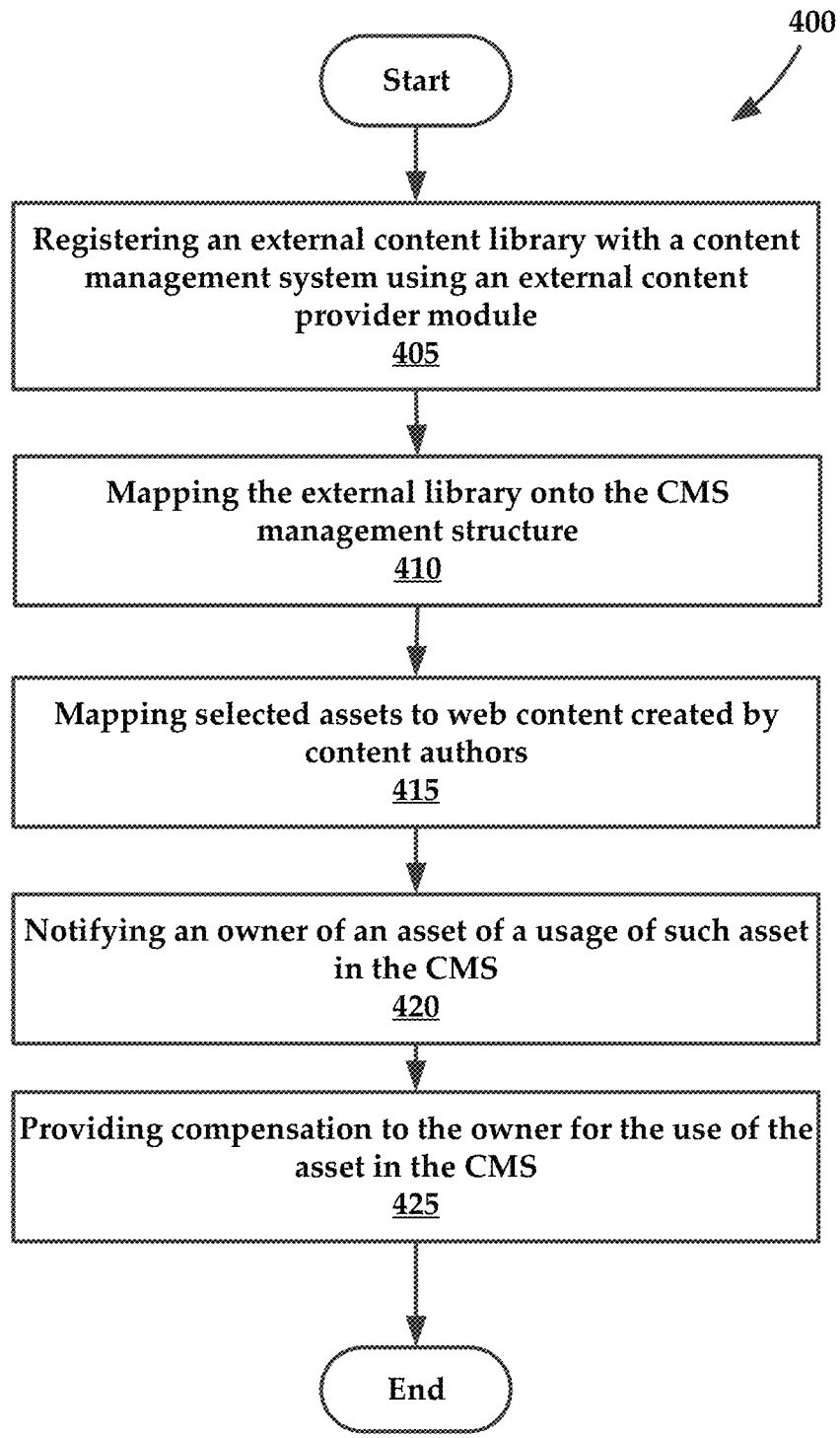
FIG. 4 is a flowchart of an exemplary method for using an external content library.

FIG. 4 is a flowchart of an exemplary method 400 for using an external content library. The method 400 may comprise a step 405 of registering an external content library with a content management system using an external content provider module. It is noteworthy that in some instances, the content management system may also be associated with at least one local content repository. The method 400 may also include a step 410 of mapping the external content library onto the CMS management structure. The step 410 of mapping the external content library may comprise identifying and selecting content/assets and associated basic information about the assets from the external content library.

The method 400 may also comprise a step 415 of mapping assets of external content libraries to web content created by content authors. An additional step 420 of mapping the selected assets to web content being created by the content authors. This includes both assets that are locally stored in the content management system and assets that reside remotely on external systems. In various embodiments, this method can include a step 425 of publishing said selected asset(s) linked by reference to a dynamic experience delivery system.

Also, the method 400 may comprise a step (not shown) of notifying the owner of an asset of usage of such asset in the CMS, such as check-in/check-out, publishing, or other use of an external asset. The method 400 may also include an optional step (not shown) of providing compensation to the owner of the asset related to the use of the asset in the CMS.

Figure 5:
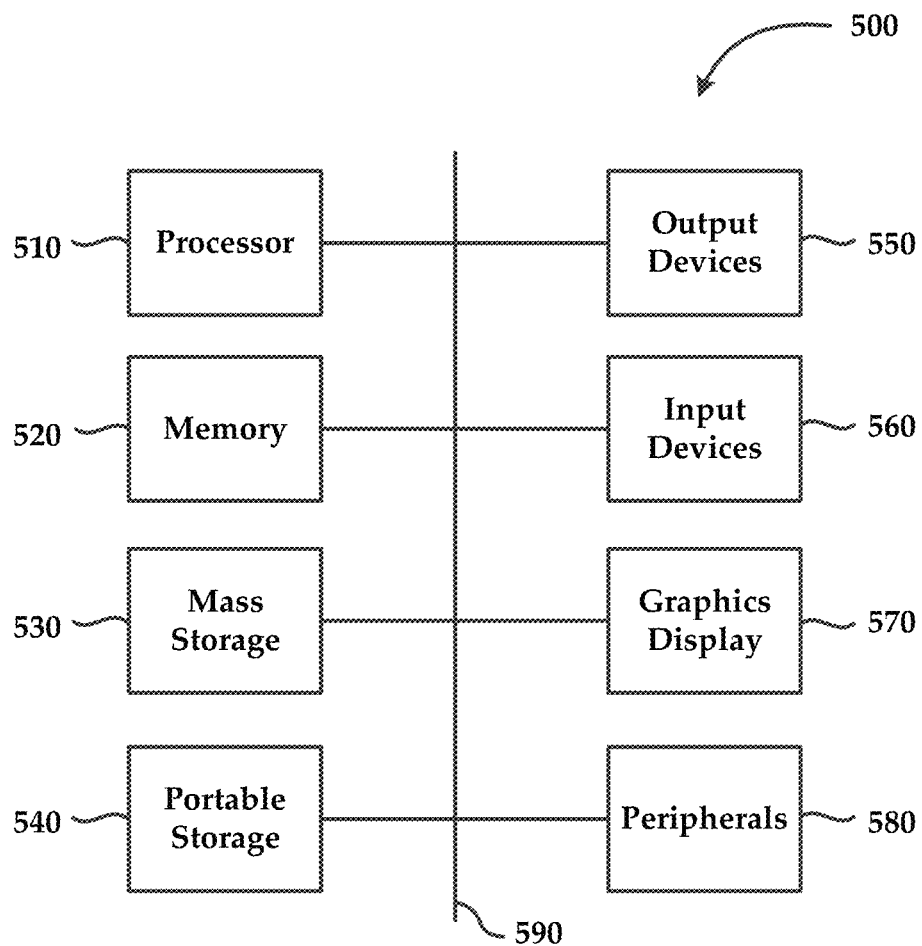
FIG. 5 is a block diagram of an exemplary computing system for implementing embodiments of the present technology.

FIG. 5 illustrates an exemplary computing system 500 (also referenced as system 500) that may be used to implement an embodiment of the present technology. The computing system 500 of FIG. 5 may be implemented in the contexts of the likes of computing systems, networks, exchanges, servers, or combinations thereof disclosed herein. The computing system 500 of FIG. 5 includes one or more processors 510 (also referenced as processor 510 and processor unit 510) and main memory 520. Main memory 520 stores, in part, instructions and data for execution by processor 510. Main memory 520 may store the executable code when in operation. The system 500 of FIG. 5 further includes a mass storage device 530, portable storage medium drive(s) 540 (also referenced as portable storage device 540), output devices 550, user input devices 560, a graphics display 570, and peripheral devices 580.

The components shown in FIG. 5 are depicted as being connected via a single bus 590. The components may be connected through one or more data transport means. Processor unit 510 and main memory 520 may be connected via a local microprocessor bus, and the mass storage device 530, peripheral device(s) 580, portable storage device 540, and graphics display 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present technology for purposes of loading that software into main memory 520.

Portable storage device 540 operates in conjunction with a portable non-volatile storage medium, such as a floppy disk, compact disk, digital video disc, or USB storage device, to input and output data and code to and from the computing system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripherals devices 580 may include any type of computer support device to add additional functionality to the computing system. Peripheral device(s) 580 may include a modem or a router.

The components provided in the computing system 500 of FIG. 5 are those typically found in computing systems that may be suitable for use with embodiments of the present technology and are intended to represent a broad category of such computer components that are well known in the art. Thus, the computing system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

Figure 6:
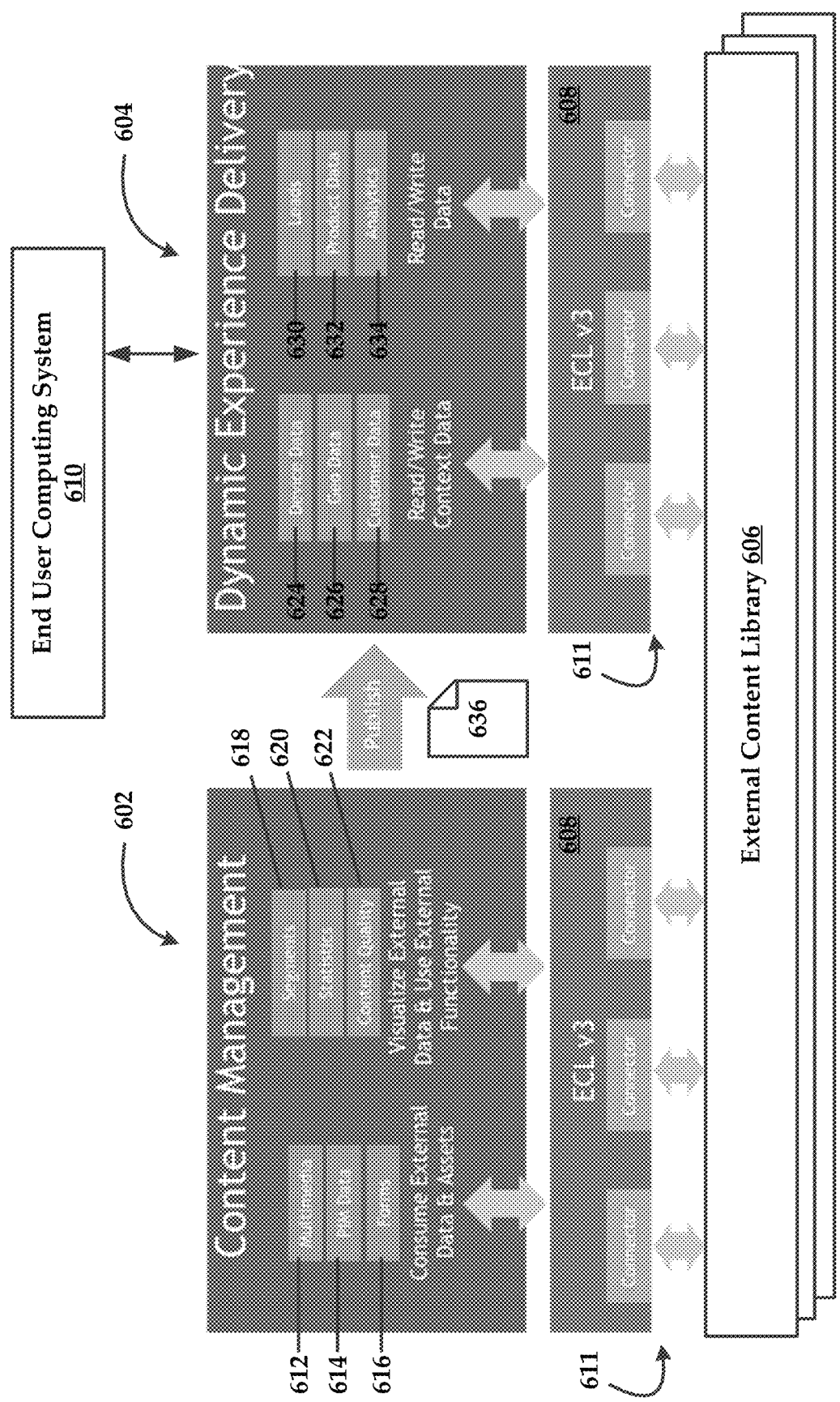
FIG. 6 is a schematic diagram of an example system for practicing aspects of the present disclosure.

FIG. 6 is a schematic diagram of an example system 600 where aspects of the present disclosure can be practiced. The system 600 generally includes a content management system 602 (referred to in some instances as a first computer), a dynamic experience delivery system 604 (referred to in some instances as a second computer), an external content library 606 (referred to in some instances as a remote system), an external content library connector system 608 (referred to in some instances as a third computer), and an end user computing system 610.

In FIG. 6 an instance of the external content library connector system 608 is illustrated with respect to the content management system 602 and an instance of the external content library connector system 608 is illustrated with respect to the dynamic experience delivery system 604, although it will be understood that the external content library connector system 608 is a single computing entity that can be accessed by both the content management system 602 and the dynamic experience delivery system 604.

In general, in one embodiment content management system 602 can be utilized to generate web content and may operate using .NET as its core application layer. Also, the dynamic experience delivery system 604 is used to deliver web content to end users, but the dynamic experience delivery system 604 may utilize Java as its core application layer. Thus, an incompatibility exists between the content management system 602 and the dynamic experience delivery system 604 based on this difference in core application type. This poses a technical problem when each of these systems needs to access assets on the external content library 606, and even more so when the content management system 602 and the dynamic experience delivery system 604 cooperate to deliver web content to an end user.

While embodiments herein relate to accessing assets on external content libraries, the present disclosure enables the use of the external content library connector system 608 to provide access to remote systems that are more than external content libraries. Indeed, some remote systems include services such as ERP (enterprise resource planning), media, marketing, remote storage, and so forth.

In more detail, web content is created using the content management system 602 and certain assets that are to be included in the web content are stored on the external content library 606, an example asset can be linked to the web content using a reference. In some embodiments the reference indicates where the asset resides on the external content library 606 and how that asset can be accessed for read and/or write operations.

The .NET framework utilized by the content management system 602 may not be compatible with the framework used on the dynamic experience delivery system 604. This incompatibility can be solved by using the external content library connector system 608 that allows each of the content management system 602 and the dynamic experience delivery system 604 to access the external content library 606 without regard to their underlying application layer or framework type.

The external content library connector system 608 utilizes connectors for each unique external content library, allows for references generated by the content management system 602 to be resolved by the dynamic experience delivery system 604 without having to resolve data that is in .NET format. To be sure, while .NET and Java have been described, it will be understood that the connector features described herein can be utilized to provide connectivity and cooperative functionality between any two systems that utilize dissimilar application layers or frameworks relative to one another such as Python. Pearl. and Nodejs—just to name a few. In some embodiments, a connector is generated by a content author. In some embodiments, a launcher system can be used to invoke and utilize these connectors as needed based on the application type or framework utilized by the requesting system.

That is, for each unique external content library, the external content library connector system 608 utilizes a unique connector. Example connector(s) 611 are utilized to obtain or gain access to assets from external content libraries such as external content library 606. The content management system 602 and/or the dynamic experience delivery system 604 can invoke and utilize the external content library connector system 608 and its connector(s) 611 as needed. In some instance, the use of a connector is prompted when a reference to an asset on the external content library 606 is being resolved by the dynamic experience delivery system 604, as will be discussed in greater detail below.

In various embodiments, the external content library connector system 608 can utilize a plurality of connectors for each unique external content library, with each connector being created to service a unique framework or language type. Thus, the external content library connector system 608 can create a plurality of unique connectors for an ERP external content library (e.g., external system). For example, one connector is configured for .NET and one connector is configured for Java or another unique framework or language type.

Broadly described, the system 600 allows for the creation of web content in the content management system 602 that can be delivered to an end user through the dynamic experience delivery system 604. The web content can include a reference to an asset that is stored on the external content library 606. Requests for delivery of the web content are fulfilled by the dynamic experience delivery system 604 by using the connector(s) 611 when the web content references external content. This can include resolving references in the web content. In some embodiments, resolving the reference includes using one or more of the connector(s) 611 of the external content library connector system 608 to access the external content library 606 retrieve the asset. After the asset is retrieved the dynamic experience delivery system 604 can integrate the asset into the web content in real-time or on-the-fly and deliver the complete web content to the end user computing system 610.

In some embodiments, the connector(s) 611 can be created for use by both the content management system 602 and the dynamic experience delivery system 604. Thus, in this example, connectors can be written in .NET and/or Java and be loaded in both .NET and Java agnostic of language. Additional descriptions of these features are described with reference to a launcher system and process which are described and illustrated in greater detail with reference to FIG. 8.

In more detail, the content management system 602 comprises various modules that allow for the creation of web content. For example, the content management system 602 may implement a multimedia module 612, a PIM data module 614, and a forms module 616. In general, these modules can consume external data and assets during creation of web content. These external data and assets are stored on the external content library 606 and are accessible through the external content library connector system 608 and its connectors. Also, it will be understood that the external content library 606 is illustrated as a single system but in use many external content libraries may be accessed by the content management system 602. Thus, the content management system 602 can obtain assets or external content from the external content library 606 through the connector(s) 611.

In various embodiments, the content management system 602 can also comprise a segments module 618, a statistics module 620, and a content quality module 622. In general, this module stack can be used to allow web content authors to visualize external data stored on the external content library 606 and use external functionality.

Broadly, the dynamic experience delivery system 604 comprises various modules. For example, the dynamic experience delivery system 604 can comprise a module stack having a device data module 624, a geo data module 626, and a customer data module 628. This module stack can be used to read and/or write context data obtained from the external content library 606 through use of the external content library connector system 608. In some embodiments, the dynamic experience delivery system 604 can comprise another module stack having a leads module 630, a product data module 632, and an analytics module 634. This stack can also be used to read and/or write data obtained from the external content library 606 through use of the external content library connector system 608 and its connector(s) 611 that are programmed in the application language or framework used by the dynamic experience delivery system 604.

In general, web content 636 generated by the content management system 602 is published to the dynamic experience delivery system 604. The dynamic experience delivery system 604 then delivers the web content 636 to the end user computing system 610.

Figure 7:
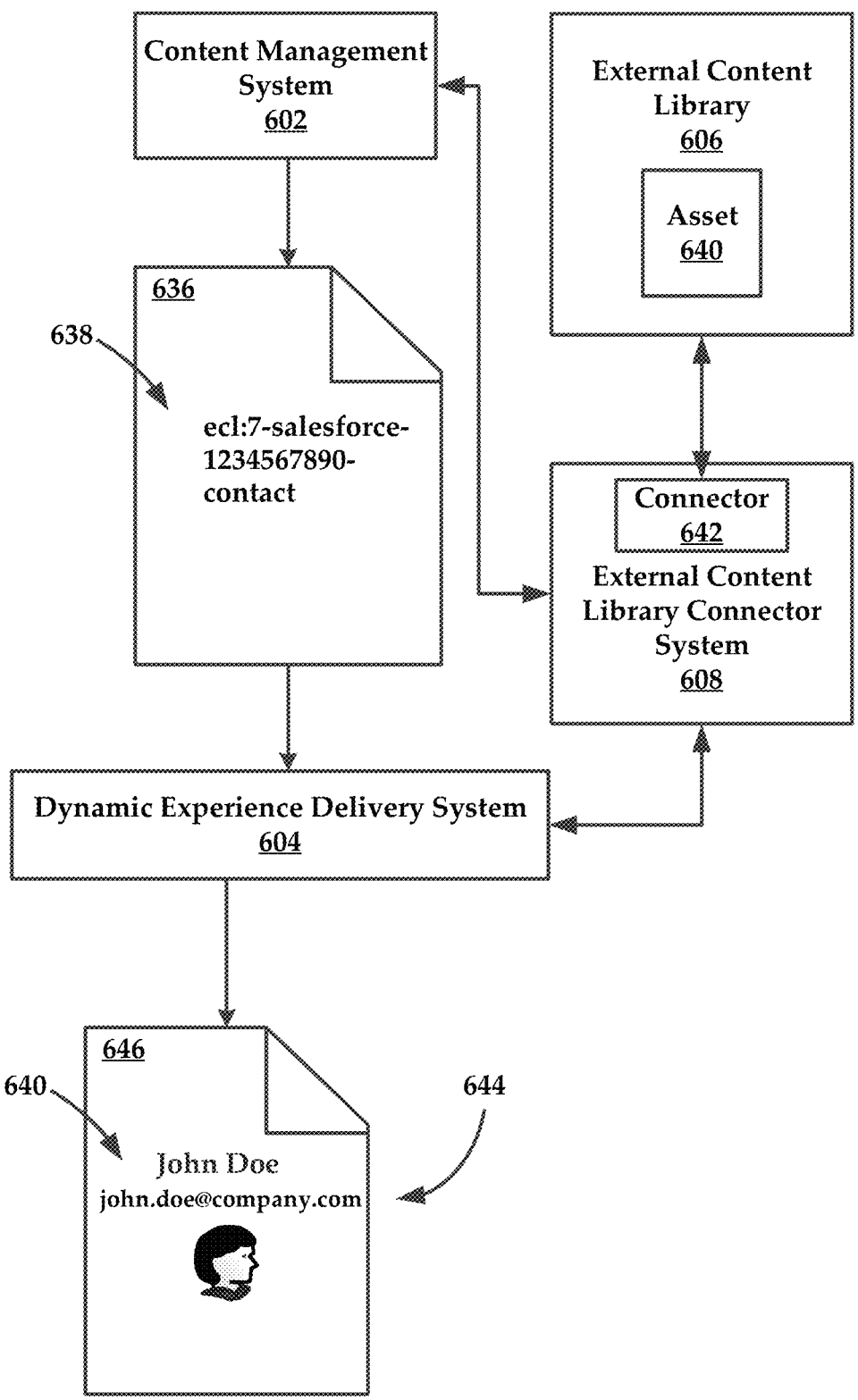
FIG. 7 illustrates the replacement of a reference in web content with an asset obtained from an external content library.

Referring now to FIGS. 6 and 7 collectively, an example process is illustrated for creating web content having a reference 638 to an asset 640 on the external content library 606, selecting a connector 642, as well as a process for resolving the reference 638 and obtaining the asset 640 from the external content library 606 using the connector 642. In general, the web content 636 is generated that could include a webpage. The web content author desires to have contact information for an employee inserted into the webpage at a location 644 when the webpage is delivered (e.g., served) to a requesting end user. Thus, rather than having the asset 640 included in the webpage when it is being created and stored, the asset 640 is only incorporated into the webpage at request. This process reduces storage requirements for both the content management system 602 and the dynamic experience delivery system 604 as neither is required to store the asset. The asset 640 remains on the external content library 606 until the webpage is requested.

Thus, rather than including the asset 640, the web content includes the reference 638 that is placed in a location on the web content 636 where the asset 640 will eventually be placed by the dynamic experience delivery system 604.

When the webpage is requested, the dynamic experience delivery system 604 reads the reference 638 and determines that the asset which is needed resides on a system that is external to both the content management system 602 and the dynamic experience delivery system 604. Using the reference, the dynamic experience delivery system 604 invokes the external content library connector system 608 to obtain the asset 640 from the external content library 606 using a connector 642. The external content library connector system 608 invokes the connector 642 and, in some embodiments, uses a portion of the content included in the reference 638 to retrieve the asset 640 from the external content library 606. In some embodiments the portion of the content included in the reference 638 is provided to the external content library connector system 608 by the dynamic experience delivery system 604.

In various embodiments the dynamic experience delivery system 604 will replace the reference 638 with the asset 640 in the web content 636 and then delivery the complete web content 636 to the end user computing system 610.

In an example use case, the reference 638 comprises ecl:7-salesforce-1234567890-contact. This reference 638 includes a plurality of portions. A first portion of the reference 638 includes characters that indicate that the asset is located externally to the content management system 602. For example, the first portion includes "ecl" which indicates that an external content library stores the asset. A second portion comprises an indication of an external content library type. In this example, "7-salesforce" indicates that the external content library type is Salesforce™ or another similar ERP (enterprise resource planning) system. This identification of external content library type also can be used by the external content library connector system 608 to indicate a specific connector or connector type that is required to retrieve the asset from the external content library 606. A third portion of the reference comprises an identifier such as "1234567890" that is indicative of the asset of the external system. In this example, the identifier refers to a specific ERP record for an individual. In various embodiments a fourth portion of the reference comprises a standard entity object such as "contact". The use of standard entity objects will be discussed in greater detail infra.

In more detail, the reference disclosed above can be broken down using the connector for Salesforce and the configuration 7 (there are multiple configurations 1-10 for example). Thus, the systems and methods provide an ability to have different configurations for a single connector type. For example a generic connector can be called CMIS Connector. The CMIS Connector can be used to connect to other Content Management Systems which expose a CMIS endpoint. Because different configurations can be used for the CMIS connector it can connect to multiple systems which have CMIS endpoints at the same time, allowing for a point-to-multipoint capability. For example, two ECL URIS (uniform resource locator) fare provided (1) ecl:1-CMIS-698769876983-Document, which relates to a document, and (2) ecl:2-CMIS-786234234934-Content, which relates to content. The ECL URIS configuration (1) connects to a SAP™ HANA™ Cloud Document Service, whereas ECL URIS configuration (2) connects to a Sharepoint™ system. Again, these are merely examples and are not meant to be limiting in any way.

In some embodiments, the dynamic experience delivery system 604 reads and parses the reference 638 to determine its various parts. The dynamic experience delivery system 604 can pass one or more portions of the reference 638 to the external content library connector system 608. The external content library connector system 608 can then select an appropriate connector and access the external content library 606 using the specific capabilities of the connector that is selected. That is, a connector can store and use data to authenticate and access the ERP application on the external content library 606 and obtain the requested contact that corresponds to the identifier 1234567890.

In general, the dynamic experience delivery system 604 is configured to identifying the reference in the web content that was inserted by the content management system 602. The dynamic experience delivery system 604 is further configured to determine that the reference in the connector refers an asset being located externally on the external system, as well as determine the external system from the second portion of the reference. Also, the dynamic experience delivery system 604 (or through the external library connector system 608) is configured to access the external system using the third portion and obtain the least one from the external system, as well as integrate the least one asset into the web content.

An example response is provided below in combination with the example reference 638 above ecl:7-salesforce-1234567890-contact. When the reference 638 corresponding to ecl:7-salesforce-1234567890-contact is utilized a response is generated by the external content library connector system 608 that is immutable across the content management system 602 and the dynamic experience delivery system 604:

```
{
  "data": {
    " contact": {
      "name": "John Doe",
      "email": "john.doe@company.com",
      "avatarImage": "https:myserver.com/udp/ecl/binary/ecl:7-salesforce-1234567890-contact-data/avatarImage"
    }
  }
}
```

Using the reference 638, an asset is returned that includes a contact name of John Doe, email address of john.doe@company.com, and an avatar of the employee. This asset is returned from the external content library and specifically in this instance an ERP system. Once returned, this asset data can be integrated into the web content 636 in place of the reference 638 by the dynamic experience delivery system 604, as illustrated in FIG. 7.

It will be understood that while some embodiments above include references such as URLs to obtain assets like images and video, the connectors disclosed herein allow the content management system 602 and/or the dynamic experience delivery system 604 to access proprietary external systems such as ERPs in order to obtain proprietary or structured data such as contacts. Rather than the reference acting as a pointer to a file, the connector provides access to an external system through a login process where the connector can gain access to the external system and expose that external system to the content management system 602 and/or the dynamic experience delivery system 604 allowing these systems to utilize assets and data on the external system.

As noted above, the dynamic experience delivery system 604 can utilize a standard entity object in order to format the asset for inclusion. In this example, a standard entity object of "contact" is used to format the asset data in a hierarchical or organized format as shown. The "contact" standard entity object can be configured or customized as desired by an end user to allow the asset data to be arranged in any desired format. The standard entity object functions as a template or layout that instructs the dynamic experience delivery system 604 as to how the asset should be arranged within the web content.

In accordance with embodiments described above, the external content library connector system 608 can be configured to register the external system(s). In some embodiments, each external system can be assigned a unique ID. In the reference above, the external content library type of salesforce is prefaced with the number seven. This can indicate a specific and registered external content library. The external content library connector system 608 can also map assets of the external system for use within the content management system as if the assets were local to the content management system, wherein the assets comprise the at least one asset. In some embodiments, the external content library connector system 608 is further configured to provide a view of the assets via a graphical user interface such as a content manager system GUI. In some instances, the registration of an external system comprises establishing a transport level security configuration between the external system and the external content library connector system and the content management system. The external content library connector system 608 is also further configured to establish end point configuration settings for the external system. To be sure, unless otherwise indicated the embodiments of FIGS. 6-9 can be combined in any suitable manner with the embodiments of FIGS. 1-5 disclosed supra.

Figure 8:
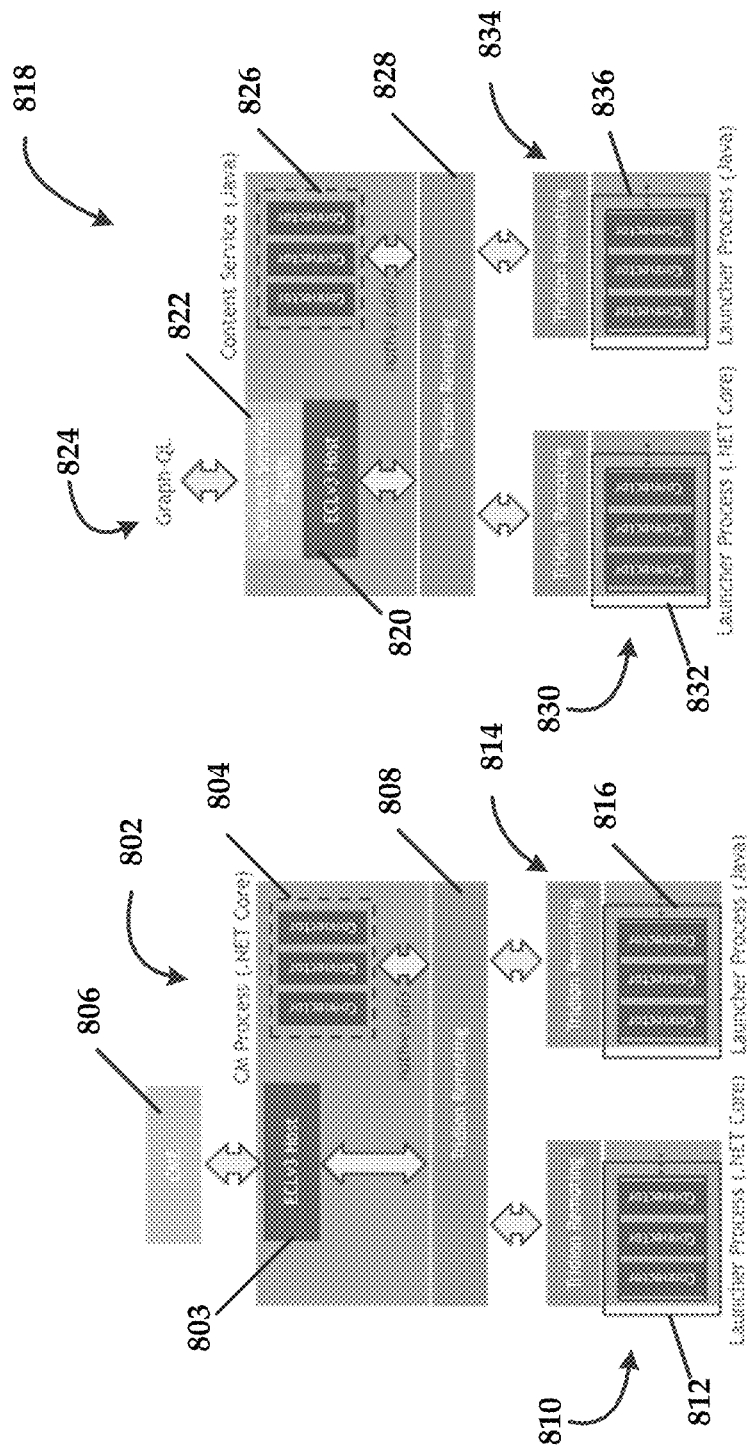
FIG. 8 schematically illustrates an example launcher system and process for creating connectors for an external content library connector system.

FIG. 8 illustrates example launcher processes created using the external content library connector system 608 that invokes connectors for any language or platform. This ensures that the external content library connector system 608 is robust and scalable.

A content manager process 802 can implement an external content library host 803 (ECLv3 Host) and a plurality of connectors 804 that can be configured by an author using a content management interface 806 (CME). The plurality of connectors 804 are configured to perform native calls through a connector interface layer 808 (Tridion Remoting). Tridion Remoting is a high-level layer that enables cross-communication between different languages/frameworks. Tridion Remoting can also be used to isolate the connector in some embodiments. Isolation ensures that if a connector crashes it can be recovered. It also this ensures that a connector failure is not going to disable operation of the system overall.

The connector interface layer 808 allows for communication with various connectors associated with launcher processes. In some embodiments, a first launcher process 810 provides connectors 812 that are configured to .NET core processes. A second launcher process 814 provides connectors 816 that are configured to Java processes.

A content service process 818, which relates to dynamic experience delivery, is also included which comprises an external content library host 820 (ECLv3 Host) and a content service plugin 822. The content service plugin 822 interfaces the external content library host 820 with a graph QL interface 824 that is utilized by administrators. Similarly to the content manager process 802, the content service process 818 comprises plurality of connectors 826 are configured to perform native calls through a connector interface layer 828 (Tridion Remoting). The connector interface layer 828 allows for communication with various connectors associated with launcher processes. In some embodiments, a first launcher process 830 provides connectors 832 that are configured to .NET core processes. A second launcher process 834 provides connectors 836 that are configured to Java processes.

Thus, both the content manager process 802 and the content service process 818 are provided with .NET core and Java connectors via specific launcher processes. Again, these application types are merely examples and are not intended to be limiting.

Figure 9:
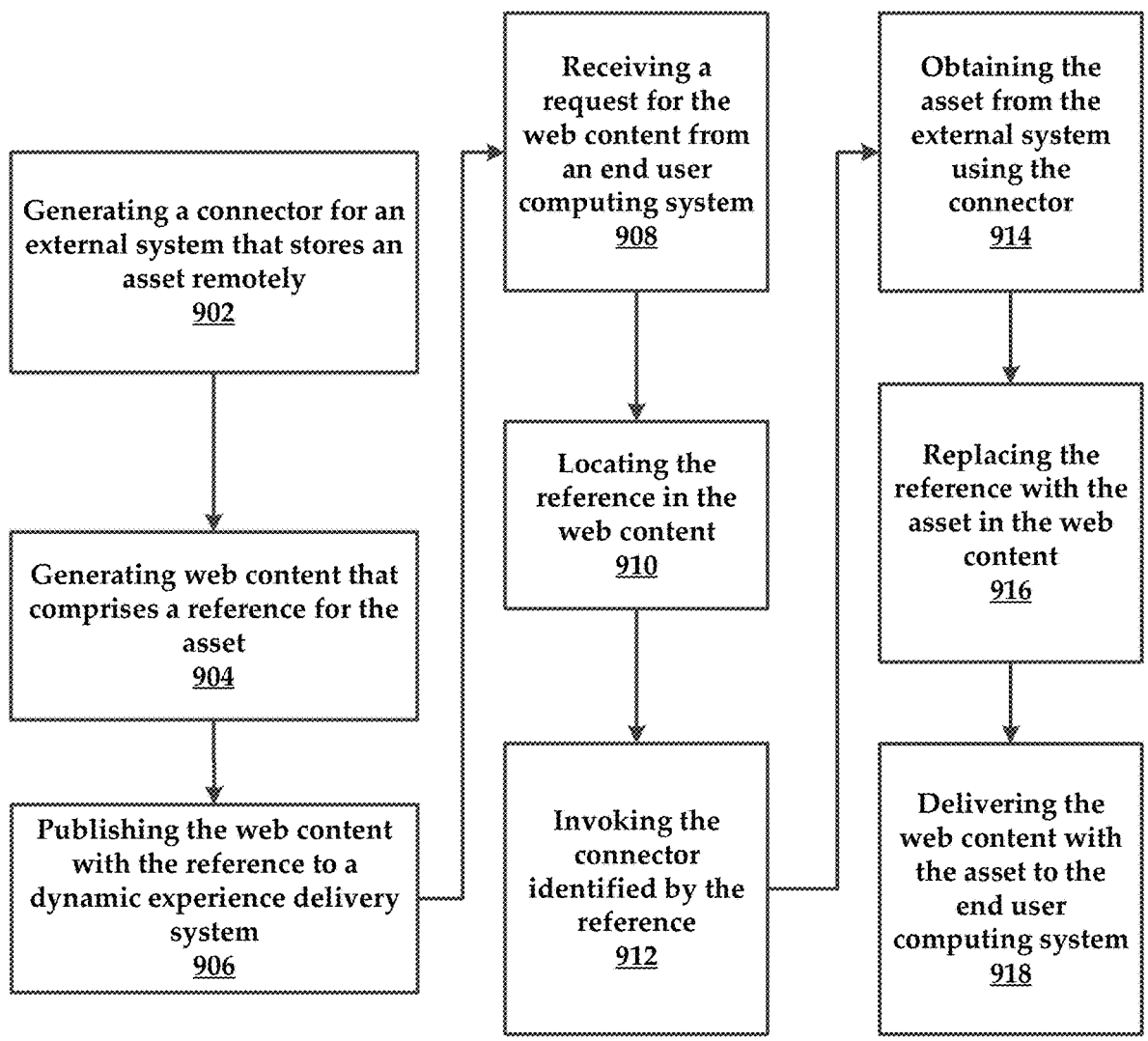
FIG. 9 is a flowchart of an example method of the present disclosure.

FIG. 9 is a flowchart of an example method of the present disclosure. The method comprises a step 902 of generating a connector for an external system that stores an asset remotely using an external content library connector system. This process step can be performed by a content author as described above. Stated differently, this method step includes receiving, by the external content library connector system a connector generated by a content author.

The connector can be configured to allow the external content library connector system or other system components such as the content management system and/or a dynamic experience delivery system to utilize the external content library/external system. The connector can include a means for logging onto or gaining access to external content library such as login and/or authentication credentials.

Next, the method includes a step 904 of generating web content that comprises a reference for the asset. In some embodiments the reference identifies at least one of the external system or the connector. That is, the reference includes data that indicates where the asset is located, either by naming the external system or by identifying the connector that is associated with the external system.

In various embodiments, the method comprises a step 906 of publishing the web content with the reference to a dynamic experience delivery system. That is, the content management system publishes the web content having the reference to the dynamic experience delivery system.

In certain embodiments, the method includes a step 908 of receiving a request for the web content from an end user computing system. This step can be performed by the dynamic experience delivery system. The method steps following can also be performed by the dynamic experience delivery system. For example, the dynamic experience delivery system can resolve the reference by performing a step 910 of locating the reference in the web content. That is, the dynamic experience delivery system scans the web content for the reference. Next, the method includes a step 912 of invoking the connector identified by the reference. This process can be performed by the external content library connector system. Invoking the connector can include the connector logging onto the external system and exposing the external system to the dynamic experience delivery system. In some embodiments, the connector that is invoked is selected based on an underlying language or framework utilized by the requesting system such as the dynamic experience delivery system. For example, if the dynamic experience delivery system uses Java, the connector invoked would be a Java based connector for the external system that hosts the asset.

Next, the method includes a step 914 of obtaining the asset from the external system using the connector. In various embodiments, the asset is obtained by identifying information that was included in the reference.

Once the asset is obtained, the method includes a step 916 of replacing the reference with the asset in the web content, and a step 918 of delivering the web content with the asset to the end user computing system.

In one or more embodiments, the method includes allowing any of the content management system and/or the dynamic experience delivery system to access external content libraries using the connectors provided through the external content library connector system.

In various embodiments, prior to step 912 of invoking the connector, the method can include steps related to parsing and evaluating the reference found in the web content and using data encoded into the reference to locate a connector that is used to obtain the desired asset.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEP-ROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system, comprising:
   a first computer comprising at least one processor coupled to at least one memory, the first computer configured to generate web content that comprises at least one reference that is indicative of at least one asset stored on an external system that is remote to the first computer and at least one local asset stored on a local content repository that is local to the first computer, the at least one local asset comprising content;
   a second computer comprising at least one processor coupled to at least one memory, the second computer configured to publish the web content when requested by an end user; and
   a third computer comprising at least one processor coupled to at least one memory, the third computer configured to provide a connector that is accessible to both the first computer and the second computer, the first computer being further configured to generate the at least one reference, the second computer being configured to resolve the at least one reference and obtain the at least one asset from the external system using the connector.

2. The system according to claim 1, wherein a first program utilized by the first computer to generate the web content is incompatible with a second program utilized by the second computer to deliver the web content to an end user computing system and the connector allows the first computer and the second computer to cooperate to provide the end user computing system with the at least one asset.

3. The system according to claim 1, wherein the first computer is further configured to generate the at least one reference, wherein the at least one reference comprises a first portion that indicates that the at least one asset is located externally to the first computer, a second portion that comprises an indication of an external content library type, and a third portion that comprises an identifier that is indicative of the at least one asset of the external system.

4. The system according to claim 3, wherein the second computer utilizes the at least one reference published by the third computer to obtain the at least one asset by:
   identifying the at least one reference in the web content;
   determining that the at least one reference refers to the at least one asset being located externally on the external system;
   determining the external system from the second portion of the at least one reference and the connector that corresponds;
   accessing the external system through the connector using the third portion;
   obtaining the at least one asset from the external system using the connector; and
   integrating the at least one asset into the web content.

5. The system according to claim 4, wherein the second computer integrates the at least one asset into the web content in response to a request for the web content.

6. The system according to claim 4, wherein the second computer integrates the at least one asset into the web content using a standard entity object, wherein the standard entity object determines how content of the at least one asset is formatted for integration into the web content.

7. The system according to claim 6, wherein the standard entity object is customizable through use of the third computer.

8. The system according to claim 1, wherein the third computer is further configured to:
   register the external system;
   create the connector for the external system; and
   map assets of the external system as if the assets were local to the first computer or the second computer, wherein the assets comprise the at least one asset.

9. The system according to claim 8, wherein the connector comprises login credentials that are used to gain access to the external system and exposes the external system to the first computer or the second computer.

10. The system according to claim 1, wherein the third computer is further configured to establish end point configuration settings for the external system, and wherein registering comprises establishing a transport level security configuration between the external system and the third computer and the first computer.

11. The system according to claim 1, wherein upon selection of the at least one asset from the external system via the first computer, the third computer is further configured to map the at least one asset from the external system to the at least one reference that is included in the web content being generated on the first computer.

12. A method comprising:
   generating, by a first computer, web content that comprises at least one reference that is indicative of at least one asset stored on an external system that is remote to the first computer and at least one local asset stored on a local content repository that is local to the first computer, the at least one local asset comprising content;
   publishing, by a second computer, the web content when requested by an end user;
   providing, by a third computer, a connector that is accessible to both the first computer and the second computer;
   generating, by the first computer, the at least one reference; and
   resolving, by the second computer the at least one reference and obtaining the at least one asset from the external system using the connector.

13. The method according to claim 12, wherein a first program utilized by the first computer to generate the web content is incompatible with a second program utilized by the second computer to deliver the web content to an end user computing system and the connector allows the first computer and the second computer to cooperate to provide the end user computing system with the at least one asset.

14. The method according to claim 12, wherein the at least one reference comprises a first portion that indicates that the at least one asset is located externally to the first computer, a second portion that comprises an indication of an external content library type, and a third portion that comprises an identifier that is indicative of the at least one asset of the external system.

15. The method according to claim 14, further comprising utilizing, by the second computer, the at least one reference published by the third computer to obtain the at least one asset by:
    identifying the at least one reference in the web content;
    determining that the at least one reference refers to the at least one asset being located externally on the external system;
    determining the external system from the second portion of the at least one reference and the connector that corresponds;
    accessing the external system through the connector using the third portion;
    obtaining the at least one asset from the external system using the connector; and
    integrating the at least one asset into the web content.

16. The method according to claim 15, further comprising integrating, by the second computer, the at least one asset into the web content in response to a request for the web content.

17. The method according to claim 15, further comprising integrating, by the second computer, the at least one asset into the web content using a standard entity object, wherein the standard entity object determines how content of the at least one asset is formatted for integration into the web content.

18. The method according to claim 17, wherein the standard entity object is customizable through use of the third computer.

19. The method according to claim 12, further comprising:
    register, by the third computer, the external system;
    create, by the third computer, the connector for the external system; and
    map assets of the external system, by the third computer, as if the assets were local to the first computer or the second computer, wherein the assets comprise the at least one asset.

20. The method according to claim 19, wherein the connector comprises login credentials that are used to gain access to the external system and exposes the external system to the first computer or the second computer.

21. The method according to claim 12, further comprising establishing, by the third computer, end point configuration settings for the external system, and wherein registering comprises establishing a transport level security configuration between the external system and the third computer and the first computer.

22. The method according to claim 12, further comprising, upon selection of the at least one asset from the external system via the first computer, mapping, by the third computer, the at least one asset from the external system to the at least one reference that is included in the web content being generated on the first computer.

* * * * *